J. ALSFASSER.
DAMPER.
APPLICATION FILED MAY 15, 1920.
1,395,784.
Patented Nov. 1, 1921.
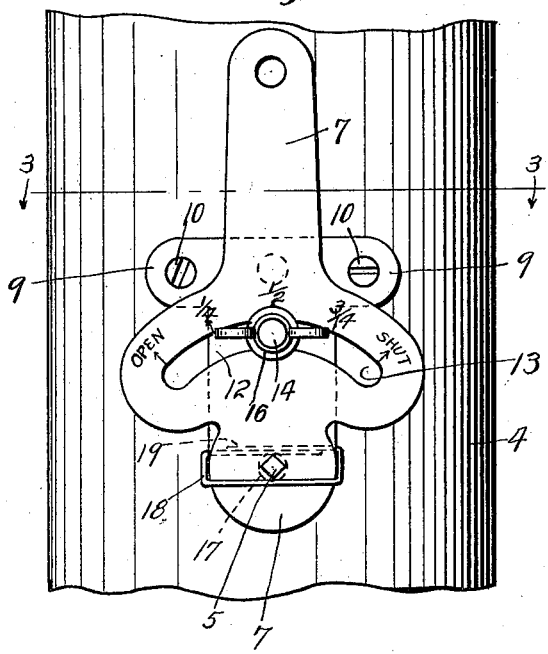
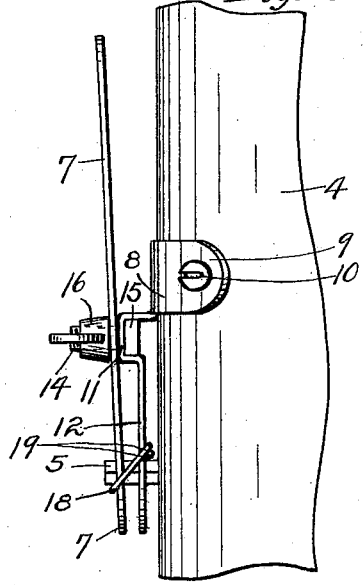
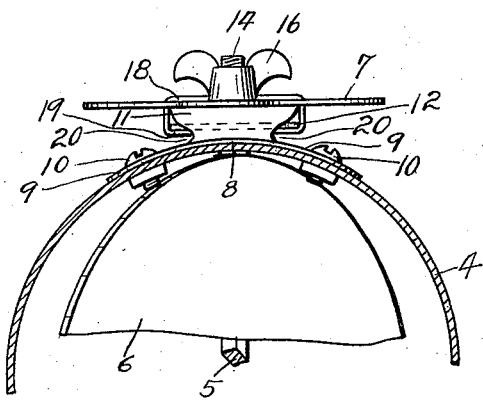
Inventor.
Joseph Alsfasser
By Charles M. Nissen.
Atty.

UNITED STATES PATENT OFFICE.

JOSEPH ALSFASSER, OF CHICAGO, ILLINOIS.

DAMPER.

1,395,784.  Specification of Letters Patent.  Patented Nov. 1, 1921.

Application filed May 15, 1920. Serial No. 381,634.

*To all whom it may concern:*

Be it known that I, JOSEPH ALSFASSER, a citizen of the United States, residing at Chicago, in the county of Cook and State of Illinois, have invented a certain new and useful Improvement in Dampers, of which the following is a specification.

My invention relates to dampers and has for its object the provision of simple and efficient operating and locking means for dampers, and the like.

Other objects will appear hereinafter.

An embodiment of my invention is shown in the accompanying drawing, forming a part of this application, and in which—

Figure 1 is a plan view of the damper mechanism applied to a portion of a pipe, or the like;

Fig. 2 is a side view of the same; and

Fig. 3 is a section taken on line 3—3 of Fig. 1.

In the drawing, I have indicated a pipe 4 which may be a smoke-pipe, air pipe, or the like, in which it is proposed to use a damper. The pipe 4 is provided with perforations in which are journaled the ends of a damper spindle 5 and on this damper spindle is secured in any desirable manner a damper 6.

The damper spindle 5 may be provided in any suitable cross-section but one end extending out through the pipe 4 should be non-round. On this non-round end is fitted a lever 7 for operating the damper and spindle. I have shown the damper spindle as being square, indicating one form of non-round cross-section thereof.

I have provided a support for the damper spindle which can be made of inexpensive sheet material. This support has a foot portion 8 with ears 9 attached to the pipe 4 by means of stove bolts 10, or their equivalent. The foot part 8 is offset upwardly from the pipe 4, as at 11, and a portion 12 is disposed substantially parallel to the lever 7. The offset portion 11 forms a support and means for locking the lever 7. I have indicated a slot 13 in the lever 7 which is disposed in the arc of a circle about the axis of damper spindle 5. Through the offset portion 11 and slot 13 is a bolt 14 having its head substantially fitting the recessed side of the offset portion 11 so as to hold the head against rotation. A thumb nut 16 is threaded upon the bolt and upon being turned down against the lever 7 positively locks the latter.

The portion 12 is provided with an opening 17 sufficiently large to permit the rotation of damper spindle 5. A wire 18 is given loop form and passes around one end of lever 7, part 12, and the damper spindle 5. This wire loop preferably has one side engaging one side of the damper spindle and another side engaging the opposite side of the damper spindle so as to prevent movement of said loop longitudinally of the lever 7 and part 12. The loop 18 also engages the edges of lever 7 and part 12 to hold it against lateral displacement from said members 12 and 7. The wire loop 18 may be formed with its end portions overlapping, as indicated in Figs. 1 and 2 at 19, or formed in any desirable manner and is preferably formed so as to tend to hold the parts 7 and 12 against movement away from each other. It will be noted in Fig. 2 that the outer surface of offset portion 11 is substantially parallel with part 12 and that lever 7 is disposed on offset portion 11 at an acute angle to said part 12. The lever is held in this position by the loop 18 holding adjacent portions of the parts 7 and 12 closer together than portions of said members adjacent offset portion 11. Due to this particular construction upon nut 16 being turned down tightly on bolt or screw 14 there will be a tendency to put bending strains on members 7 and 12 by said wire loop 18. The end of lever 7 adjacent the damper spindle is preferably circular, as indicated in Fig. 1, so that as said lever moves about with the damper spindle the wire loop 18 will not bind against the edges of such lever.

The foot portion 8 of the support is preferably shaped to fit the outside of the pipe 4, as clearly indicated in Fig. 3. In order to make a flat piece of sheet material easily bent to fit the pipe I preferably cut away a part of the offset portion 11 of the support, as at 20 in Fig. 3. By thus cutting away this portion comparatively inexpensive material can be used for forming the support. It will also be apparent that the lever 7 is flat and may also be made from comparatively inexpensive material.

It will be found convenient to indicate on the lever 7 adjacent the slot 13 notations so as to help the operator in knowing just how nearly open or closed the damper may be, or, to know just where to set the damper to accomplish his desired result. I have, therefore, made graduations with the notations "Open" "One-quarter" "One-half" "Three-quarter" and "Shut." Any other notations and more graduations may be added if desired. It will be apparent that since there is nothing on the outside of lever 7 adjacent the slot 13, except the nut 16, that these notations will be clearly discernible.

I claim:—

1. In combination, a pipe; a damper spindle in the pipe with one end extending therefrom; a supporting plate attached to the pipe and having a bearing engaging the damper spindle; a lever attached to the damper spindle and disposed at an angle to said supporting plate; a wire loop extending around the damper spindle, lever and supporting plate; a bolt disposed through the supporting plate and lever; and a nut threaded on the bolt, the bolt and nut binding said lever against said supporting plate.

2. In combination, a pipe, a supporting plate disposed on said pipe and having a portion offset away from the latter; a lever engaging the offset part of said supporting plate and spaced from other parts of the latter; a bolt passing through said offset portion and lever; a nut on the bolt; a damper spindle in the pipe having a portion extending through said supporting plate and lever; and a loop disposed around the supporting plate, lever and damper spindle and tending to hold adjacent ends of said lever and supporting plate against spreading apart.

3. In combination, a pipe; a supporting plate disposed on said pipe and having a portion offset away from the pipe with the outer surface of said offset portion substantially parallel to the rest of said member; a lever disposed on said outer surface; a bolt passing through said offset portion and lever; a nut threaded on said bolt and holding the lever against said outer surface; a damper spindle in the pipe extending out through said supporting plate and lever; and a loop disposed around the lever, supporting plate and damper spindle holding the lever at an acute angle to said supporting plate.

In testimony whereof I have signed my name to this specification on this 30th day of April, A. D. 1920.

JOSEPH ALSFASSER.